UNITED STATES PATENT OFFICE.

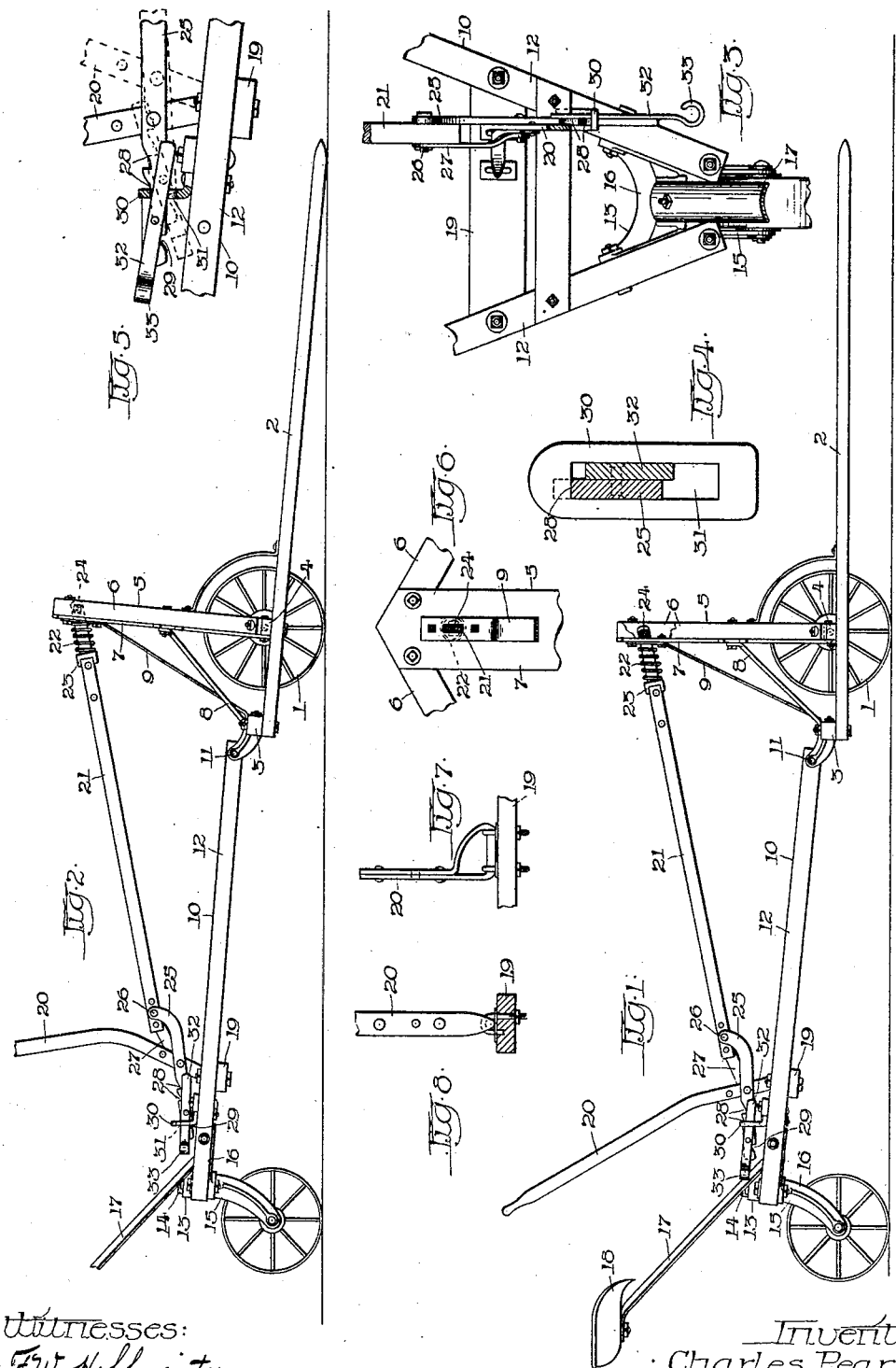

CHARLES PEARSON, OF CHICAGO, ILLINOIS, ASSIGNOR TO INTERNATIONAL HARVESTER COMPANY, A CORPORATION OF NEW JERSEY.

HAY-RAKE.

No. 930,314.  Specification of Letters Patent.  Patented Aug. 3, 1909.

Application filed April 3, 1909. Serial No. 487,760.

*To all whom it may concern:*

Be it known that I, CHARLES PEARSON, a citizen of the United States, residing at Chicago, in the county of Cook and State of Illinois, have invented certain new and useful Improvements in Hay-Rakes, of which the following is a specification.

My invention relates to hay rakes of the sweep type, and is particularly adapted to such as are provided with a push pole propelling mechanism in rear of the rake, and it consists in improved means for controlling a tilting movement of the rake frame about its axis relative to the propelling means; the object of my invention being to provide a construction of rake controlling mechanism that will be simple, strong, including few parts, and efficient in operation. I attain this object by means of the mechanism illustrated by the accompanying drawing, in which—

Figure 1 is a side elevation of a hay rake having my invention forming a part thereof and showing the points of the rake teeth as raised above the ground line; Fig. 2 is a side elevation of the rake showing the teeth as resting upon the ground; Fig. 3 is a top plan view of part of the rake and the controlling mechanism; Fig. 4 is a detached detail of the controlling means; Fig. 5 is a side elevation of part of Fig. 3; Fig. 6 is a detached detail drawing of part of the rake frame showing the manner of connecting the controlling bar thereto; Fig. 7 is a detail drawing designed to illustrate the construction of the lower end of the hand lever and the manner of connecting it with the frame of the machine; and Fig. 8 is a side elevation of Fig. 7.

Like reference characters denote the same parts throughout the several views.

1 represents one of the carrying wheels journaled upon a part of the rake frame, and 2 rake teeth secured to the transversely arranged frame bar 3 at their rear ends in rear of the axis of the wheels.

4 represents a supplemental transverse bar substantially in line with the axis of the wheels and having the teeth secured thereto.

5 represents a vertically arranged frame, including bars 6 having their lower outer ends secured to bar 4, their upper converging ends meeting centrally of the machine, as shown in Fig. 6, and Fig. 7 represents a strut having its upper end secured to the bar 6 and its lower end to bar 4.

8 represents brace members secured to bars 6 and 3, and 9 a brace member secured to the strut and bar 3.

10 represents a frame having its forward end hinged to the rake frame at 11, and including rearwardly converging bars 12 that have secured to their rear ends a casting 13 provided with a bearing adapted to receive the vertical stem 14 of a caster wheel mechanism 15 and the shelf portion 16, to which is secured the lower end of a seat spring 17, and 18 represents a seat secured to the upper end of the spring. A cross bar 19 is secured to the frame bars 12, and 20 represents a hand lever having its lower end pivotally connected with the cross bar, as shown in Figs. 7 and 8.

21 represents a rake controlling bar having its upper forward end slidably connected with the upper end of the brace member 9 and strut 7, and 22 represents a spring operative between an abutment 23, secured to the bar, and the strut in a manner to yieldingly tilt the rake frame in a direction to cause the teeth to follow the surface of the ground.

24 represents a pin passing through the bar and operative to limit the movement of the frame relative to the bar in one direction.

25 represents a latch bar pivotally connected intermediate its ends to the hand lever and having its forward end turned upward and pivotally connected with the rear end of the rake controlling bar at 26, the axis of its pivotal connection being above a line drawn from the axis of the upper end of the bar through the axis of the pivotal connection of the latch bar with the hand lever; the connection between the lever and latch bar and rake controlling bar being reinforced by means of a supplemental bar 27 upon the opposite side thereof. The latch bar is provided with a series of notches 28 upon its upper edge in rear of the hand lever and a notch 29 upon its lower edge near the rear end of the bar; the notches being adapted to engage with a vertically arranged standard 30 secured to a fixed part of the frame, and having a vertical slot 31 therein that receives the latch bar in a slidable manner. The movement of the latch bar is controlled by means of a foot lever 32 pivotally connected with the rear end of the bar and having its forward end received by the slot 31 and its rear end provided with an eye portion 33.

When the machine is in operation and the operator desires to adjust the teeth to their raking position, he first presses down upon the foot lever and causes its forward end to contact with the slotted standard in a manner to cause the latch bar to be disengaged from the eye of the standard and then a forward movement of the hand lever will rock the rake about its axis until the forward ends of the rake teeth contact with the ground, and a further movement of the hand lever in a forward direction will compress the spring 22 and thereby cause the teeth to be yieldingly held in raking position; and when the hand lever is released the action of the spring will cause the controlling bar to move rearward in a manner to rock the latch bar about its pivotal connection and cause the notch upon its lower edge to engage with the standard in a manner to lock the rake in its raking position. The movement of the latch bar relative to the holding standard is such as to cause the pivotal connection of the foot lever to be forward of the standard when the rake is locked in raking position, as shown in Fig. 2, and in rear thereof when the rake teeth are elevated to carry the load, as shown in Fig. 1; the teeth upon the upper edge of the latch bar being caused to engage with the standard by a slight forward movement of the controlling bar and hand lever when the latch is in the position shown in Fig. 1, and movement of the rear end will cause its forward end to engage with the standard at the upper end of the slot in a manner to disengage the latch bar by causing its rear end to move downward to the position shown in Fig. 2, and downward pressure of the rear end of the foot lever will cause it to engage with the standard at the lower end of the slot in a manner to disengage the latch bar and cause its rear end to move upward.

What I claim as my invention, and desire to secure by Letters Patent, is:

1. A sweep rake including, in combination, a tilting frame having rake teeth secured thereto, rake propelling means including a frame pivotally connected to the rear end of said tilting frame, a hand lever pivotally connected with said propelling frame, a latch bar pivotally connected with said hand lever, a rake controlling bar having its forward end pivotally connected with said tilting frame and its rear end pivotally connected with one end of said latch bar at a point removed from a straight line drawn through the axes of the latch bar upon the hand lever and the controlling bar upon the tilting frame, the opposite end of said latch bar being adapted to engage with a fixed part of the propelling frame in a manner to lock the tilting frame in adjusted position.

2. A sweep rake including, in combination, a tilting frame having rake teeth secured thereto, rake propelling means including a frame pivotally connected to the rear end of said tilting frame, a hand lever pivotally connected with said propelling frame, a latch bar pivotally connected with said hand lever and having an upturned portion at its forward end, a rake controlling bar having its forward end pivotally connected with said tilting frame and its rear end pivotally connected with the upturned end of said latch bar at a point above a straight line drawn through the axes of the latch bar upon the hand lever and the controlling bar upon the tilting frame, the opposite end of said latch bar being provided with notches adapted to engage with a fixed part of the propelling frame in a manner to lock the tilting frame in adjusted position.

3. A sweep rake including, in combination, a tilting frame having rake teeth secured thereto, rake propelling means including a frame pivotally connected to the rear end of said tilting frame, a hand lever pivotally connected with said propelling frame, a latch bar pivotally connected intermediate its ends with said hand lever and having its forward end upturned, a rake controlling bar having its forward end pivotally connected with said controlling frame and its rear end with the upturned forward end of said latch bar at a point above a straight line drawn through the axes of the latch bar upon the hand lever and the controlling bar upon the tilting frame, the rear end of said latch bar being provided with notches, a standard secured to said propelling frame and having a slot therein adapted to receive the notched portion of said latch bar in a manner to lock the rake in adjusted position, and a foot lever pivotally connected with said latch bar and adapted to contact with said standard in a manner to disengage said bar when moved in one direction.

CHARLES PEARSON.

Witnesses:
   RAY PATTESON,
   FRANK V. ZABILKA.